United States Patent
Guey et al.

(10) Patent No.: US 10,873,862 B2
(45) Date of Patent: Dec. 22, 2020

(54) REFERENCE SIGNAL DESIGN FOR BEAMFORMING IN WIRELESS COMMUNICATION SYSTEMS

(71) Applicant: MEDIATEK INC., Hsinchu (TW)

(72) Inventors: Jiann-Ching Guey, Hsinchu (TW); Chia-Hao Yu, Hsinchu (TW); Weidong Yang, San Jose, CA (US)

(73) Assignee: MediaTek Inc., Hsinchu (TW)

( * ) Notice: Subject to any disclaimer, the term of this patent is extended or adjusted under 35 U.S.C. 154(b) by 175 days.

(21) Appl. No.: 16/127,595

(22) Filed: Sep. 11, 2018

(65) Prior Publication Data

US 2019/0082330 A1    Mar. 14, 2019

Related U.S. Application Data

(60) Provisional application No. 62/557,202, filed on Sep. 12, 2017.

(51) Int. Cl.
*H04W 16/28* (2009.01)
*H04L 5/00* (2006.01)

(52) U.S. Cl.
CPC ........... *H04W 16/28* (2013.01); *H04L 5/0023* (2013.01); *H04L 5/0048* (2013.01); *H04L 5/0005* (2013.01)

(58) Field of Classification Search
None
See application file for complete search history.

(56) References Cited

U.S. PATENT DOCUMENTS

2013/0286960 A1  10/2013  Li et al. .................. 370/329
2014/0314167 A1  10/2014  Jeong et al. ............. 375/267

(Continued)

FOREIGN PATENT DOCUMENTS

CN   106789800 A   5/2017
CN   106899527 A   6/2017

(Continued)

OTHER PUBLICATIONS

International Search Report and Written Opinion of International Search Authority for PCT/CN2018/105185 dated Nov. 28, 2018 (10 pages).
Taiwan IPO, office action for the TW patent application 107132017 (no English translation is available) dated Aug. 30, 2019 (5 pages).

(Continued)

*Primary Examiner* — Edan Orgad
*Assistant Examiner* — Emmanuel K Maglo
(74) *Attorney, Agent, or Firm* — Helen Mao; Zheng Jin; Imperium Patent Works

(57) ABSTRACT

Apparatus and methods are provided using interleaved frequency division multiple access (IFDMA)-based beam management reference signal for TX and RX beam sweeping. In one novel aspect, a set of IFDMA-based BM RS for TX and RX beam sweeping is configured by decomposing a defined reference numerology into N equal-length sub-time units such that the TX and RX beams can switch across sub-time unit boundary. In another novel aspect, a set of IFDMA-based beam management RS for TX and RX beams are configured by concatenating a plurality of IFDMA signals each defined over a corresponding numerology, wherein at least two IFDMA signals have different numerologies. TX and RX beam sweeping are performed based on corresponding TX and RX beam switching points. In another embodiment, the RS is a channel state information RS for a downlink measurement and a sounding reference signal for an uplink measurement.

18 Claims, 9 Drawing Sheets

(56) References Cited

U.S. PATENT DOCUMENTS

| | | | |
|---|---|---|---|
| 2015/0230263 A1 | 8/2015 | Roy et al. | 455/452.2 |
| 2016/0353510 A1 | 12/2016 | Zhang et al. | 370/329 |
| 2017/0142604 A1 | 5/2017 | Reial et al. | 370/252 |
| 2017/0164248 A1 | 6/2017 | Weber et al. | 370/331 |
| 2017/0367120 A1* | 12/2017 | Murray | H04W 72/046 |
| 2018/0048375 A1* | 2/2018 | Guo | H04B 7/024 |
| 2018/0083680 A1* | 3/2018 | Guo | H04B 7/0626 |
| 2018/0083688 A1* | 3/2018 | Agiwal | H04W 12/0013 |
| 2018/0092129 A1* | 3/2018 | Guo | H04B 7/0695 |
| 2018/0124733 A1* | 5/2018 | Vilaipornsawai | H04W 64/00 |
| 2018/0219606 A1* | 8/2018 | Ng | H04L 5/0053 |
| 2018/0234959 A1* | 8/2018 | Ahn | H04W 72/046 |
| 2018/0270775 A1 | 9/2018 | Zhang et al. | |
| 2018/0295006 A1 | 10/2018 | Ren et al. | |
| 2018/0376351 A1* | 12/2018 | Nagaraja | H04B 7/0408 |
| 2019/0014570 A1* | 1/2019 | Nam | H04B 7/088 |
| 2019/0021018 A1* | 1/2019 | Nagaraja | H04W 74/008 |
| 2019/0044593 A1* | 2/2019 | John Wilson | H04W 72/085 |
| 2019/0045494 A1* | 2/2019 | Ho | H04W 76/27 |
| 2019/0052331 A1* | 2/2019 | Chang | H04B 7/0619 |
| 2019/0075014 A1* | 3/2019 | Zhou | H04W 72/042 |
| 2019/0081740 A1* | 3/2019 | Kaikkonen | H04W 72/0446 |
| 2019/0081753 A1* | 3/2019 | Jung | H04B 7/0628 |
| 2019/0158163 A1* | 5/2019 | Subramanian | H04W 72/1205 |
| 2019/0222279 A1* | 7/2019 | Xi | H04W 72/00 |
| 2019/0229789 A1* | 7/2019 | Zhang | H04B 7/0617 |
| 2020/0052740 A1* | 2/2020 | Zhang | H04L 5/0048 |
| 2020/0052939 A1* | 2/2020 | Xiong | H04L 5/0048 |
| 2020/0059398 A1* | 2/2020 | Pan | H04L 41/0654 |

FOREIGN PATENT DOCUMENTS

| | | |
|---|---|---|
| EP | 2928235 A1 | 10/2015 |
| WO | WO2014036150 A1 | 3/2014 |
| WO | WO2016095984 A1 | 6/2016 |

OTHER PUBLICATIONS

R1-1712382 3GPP TSG RAN WG1 Meeting #90, CATT, "Design of CSI-RS for beam management", Prague, Czech Republic, Aug. 21-25, 2017 (4 pages).

R1-1712249 3GPP TSG RAN WG1 Meeting #90, Huawei et al., "CSI-RS design for beam management", Prague, Czech Republic, Aug. 21-25, 2017 (6 pages).

R1-1712304 3GPP TSG RAN WG1 Meeting #90, ZTE, "On CSI-RS for beam management", Prague, Czech Republic, Aug. 21-25, 2017 (10 pages).

R1-1712557 3GPP TSG RAN WG1 Meeting #90, Intel Corp., "On CSI-RS for beam management", Prague, Czech Republic, Aug. 21-25, 2017 (4 pages).

R1-1712238 3GPP TSG RAN WG1 Meeting #90, Huawei et al, "UL SRS design for beam management and CSI acquisition", Prague, Czech Republic, Aug. 21-25, 2017 (12 pages).

R1-1714250 3GPP TSG RAN WG1 Meeting #90, Nokia et al., "SRS transmission for beam management", Prague, Czech Republic, Aug. 21-25, 2017 (5 pages).

* cited by examiner

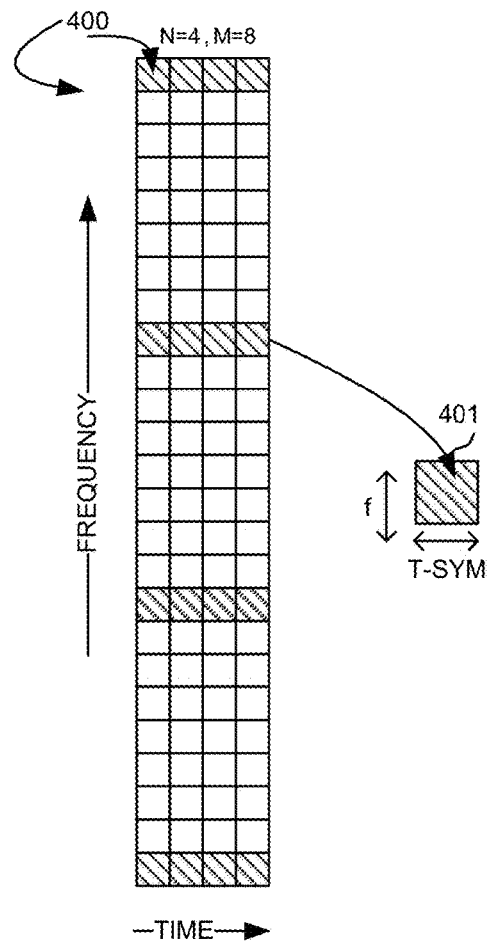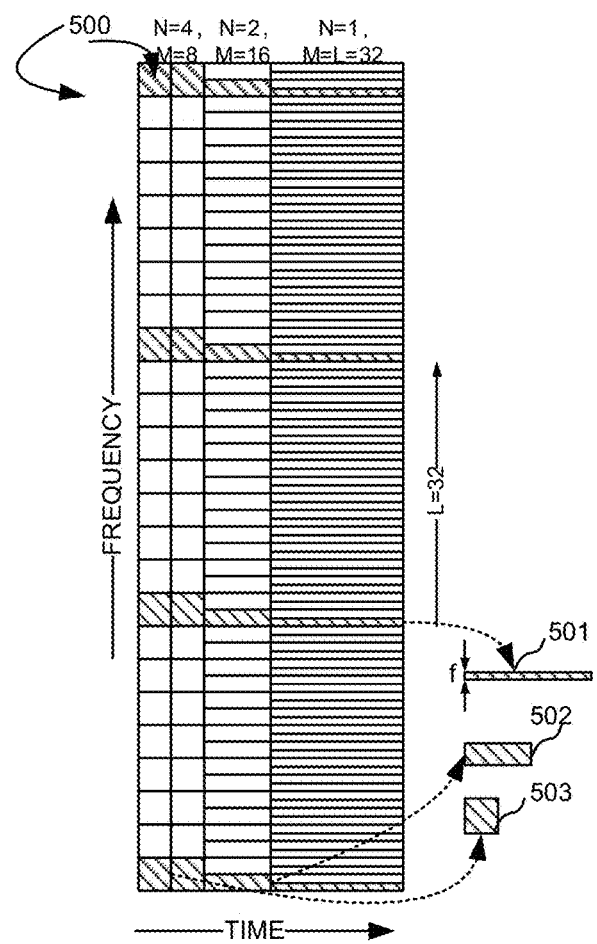
FIG. 4
FIG. 5
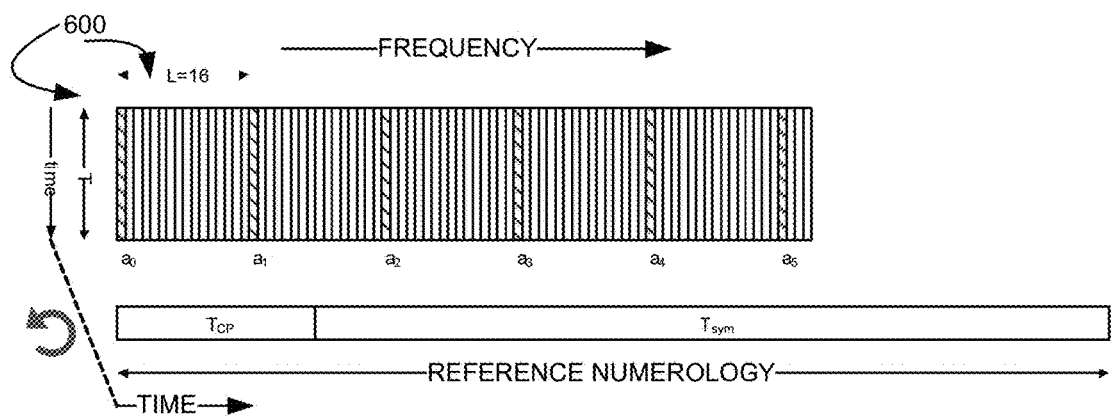
FIG. 6

REFERENCE SIGNAL DESIGN FOR BEAMFORMING IN WIRELESS COMMUNICATION SYSTEMS

CROSS REFERENCE TO RELATED APPLICATIONS

This application claims priority under 35 U.S.C. § 119 U.S. provisional application 62/557,202 entitled "Reference Signal Design for Beamforming in Wireless Communication Systems" filed on Sep. 12, 2017, the subject matter of which is incorporated herein by reference.

TECHNICAL FIELD

The disclosed embodiments relate generally to wireless communication, and, more particularly, to reference signal design for beam forming.

BACKGROUND

The fifth generation (5G) radio access technology (RAT) will be a key component of the modern access network. It will address high traffic growth and increasing demand for high-bandwidth connectivity. It will also support massive numbers of connected devices and meet the real-time, high-reliability communication needs of mission-critical applications. Both the standalone new radio (NR) deployment and non-standalone NR with LTE/eLTE deployment will be considered. For example, the incredible growing demand for cellular data inspired the interest in high frequency (HF) communication system. One of the objectives is to support frequency ranges up to 100 GHz. The available spectrum of HF band is 200 times greater than conventional cellular system. The very small wavelengths of HF enable large number of miniaturized antennas to be placed in small area. The miniaturized antenna system can form very high gain, electrically steerable arrays and generate high directional transmissions through beamforming.

Beamforming is a key enabling technology to compensate the propagation loss through high antenna gain. The reliance on high directional transmissions and its vulnerability to the propagation environment introduces particular challenges including intermittent connectivity and rapidly adaptable communication. One challenge is to shortening the time to generate the transmission (TX) and receiving (RX) pair link (BPL) profile to determine the best BPL for data transmission. The reference signal (RS) are used for beam management (BM). The BPL profile is a complete set of TX beam and RX beam pair measurement. The shorter the time span of BM RS, the faster the beam pair links are swept.

Improvements and enhancements are required for beam sweeping in the wireless network.

SUMMARY

Apparatus and methods are provided using IFDMA-based beam management RS for TX and RX beam sweeping in a wireless network. In one novel aspect, a set of IFDMA-based BM RS for TX and RX beam sweeping is configured by decomposing a defined reference numerology into N equal-length sub-time units such that the TX and RX beams can switch across sub-time unit boundary. A plurality of TX and RX beam switching points within the reference numerology for TX and RX beam sweepings are determined, respectively. TX and RX beam sweepings are performed based on the determined switching points and the TX/RX beam pair links profile is generated. In one embodiment, each sub-time unit is configured with a BM sub-carrier spacing that is N times of a reference sub-carrier spacing based on the reference numerology. In one embodiment, the TX and a RX symbol length of the reference numerology is divided equally by corresponding TX switching points and the RX switching points. In another embodiment, at least one of TX symbol length and RX length of the reference numerology is divided unequally by corresponding TX switching points and the RX switching points into unequal segments, and wherein each segment is a multiple of the sub-time unit. In one embodiment, the RX switching points are determined based on corresponding TX switching points of a TX device that the RX beams are received from. In yet another embodiment, the TX and RX beams are fixed, and wherein the BPL profile is generated by correlating receiving signals in corresponding sub-time unit with a phase-rotated modulating sequence derived from an original modulating sequence defined over the reference numerology. In one embodiment, the derived modulating sequence is a function of at least the reference numerology and the corresponding relative RX switching point time with respect to a starting TX time of corresponding OFDM symbol for the reference numerology. In another embodiment, the RS is a channel state information RS (CSI-RS) for a downlink measurement and a sounding reference signal (SRS) for an uplink measurement.

In another novel aspect, a set of IFDMA-based beam management RS for TX and RX beams are configured by concatenating a plurality of IFDMA signals each defined over a corresponding numerology, wherein at least two IFDMA signals have different numerology. A plurality of TX beam switching points for TX beam sweepings are determined, wherein each TX beam remains the same in each IFDMA signals, and wherein each TX switching points is one of boundary of adjacent IFDMA signals. A plurality of RX beam switching points within the reference numerology for RX beam sweepings are determined. TX and RX beam sweeping are performed based on corresponding TX and RX beam switching points to generate a TX/RX beam pair links (BPL) profile. In one embodiment, at least one RX IFDMA signal is divided in N sub-time units of its corresponding reference numerology, and wherein at least one RX beam switching point is at a boundary of a sub-time unit that is not the boundary of adjacent IFDMA signals. In another embodiment, the RX switching points are determined based on corresponding TX switching points of a TX device that the RX beams are received from. In yet another embodiment, the TX and RX beams are fixed, and wherein the BPL profile is generated by correlating receiving signals in corresponding sub-time unit with a phase-rotated modulating sequence derived from an original modulating sequence of corresponding IFDMA signal defined over its corresponding reference numerology. In one embodiment, the derived modulating sequence is a function of at least the corresponding reference numerology and the corresponding relative RX switching point time with respect to a starting TX time of corresponding OFDM symbol for the corresponding reference numerology.

In one embodiment, the UE receives TX beam and optionally, RX beam configuration information from the network through at least one method including the RRC signaling, the MAC CE and the DCI. In one embodiment, the UE determines its own RX beam switching configuration without the considering the TX beam configuration.

This summary does not purport to define the invention. The invention is defined by the claims.

BRIEF DESCRIPTION OF THE DRAWINGS

The accompanying drawings, where like numerals indicate like components, illustrate embodiments of the invention.

FIG. 4 shows an exemplary diagram of a CSI-RS defined over sub-time unit using an OFDM numerology corresponding to the sub-time unit with a larger sub-carrier spacing in accordance with one embodiment of the current invention.

FIG. 5 shows an exemplary diagram of using IFDMA based BM CSI-RS defined over a time unit that is a multiple of the smallest sub-time unit in accordance with embodiments of the current invention.

FIG. 6 illustrates exemplary diagrams for the single reference numerology for the IFDMA BM RS in accordance with embodiments of the current invention.

DETAILED DESCRIPTION

Reference will now be made in detail to some embodiments of the invention, examples of which are illustrated in the accompanying drawings.

Figure 1:
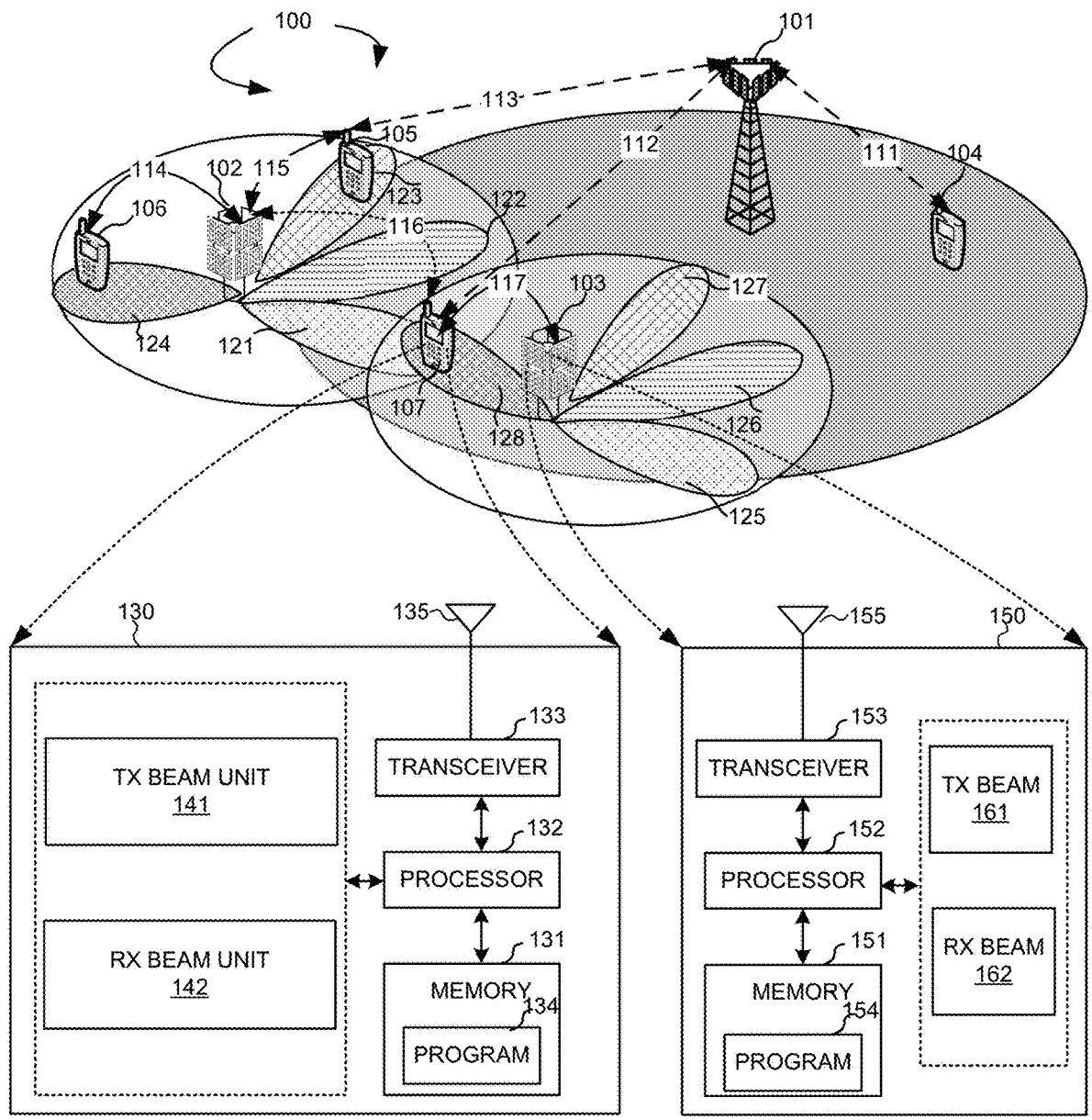
FIG. 1 is a schematic system diagram illustrating an exemplary beamforming wireless network with RS design that shortened the time for TX/RX beam sweeping to generate BPL profile in accordance with embodiments of the current invention.

FIG. 1 is a schematic system diagram illustrating an exemplary beamforming wireless network 100 with RS design that shortened the time for TX/RX beam sweeping to generate BPL profile in accordance with embodiments of the current invention. Wireless system 100 includes one or more fixed base infrastructure units forming a network distributed over a geographical region. The base unit may also be referred to as an access point, an access terminal, a base station, a Node-B, an eNode-B, a gNB, or by other terminology used in the art. As an example, base stations 101, 102 and 103 serve a number of mobile stations 104, 105, 106 and 107 within a serving area, for example, a cell, or within a cell sector. In some systems, one or more base stations are coupled to a controller forming an access network that is coupled to one or more core networks. eNB/gNB 101 is a conventional base station served as a macro eNB/gNB. gNB 102 and gNB 103 are base stations with beamforming, the serving area of which may overlap with serving area of eNB/gNB 101, as well as may overlap with each other at the edge. gNB 102 and gNB 103 has multiple sectors each with multiple beams to cover a directional area respectively. Beams 121, 122, 123 and 124 are exemplary beams of gNB 102. Beams 125, 126, 127 and 128 are exemplary beams of gNB 103. The coverage of gNB 102 and 103 can be scalable based on the number of TRPs radiating the different beams. As an example, UE or mobile station 104 is only in the service area of gNB 101 and connected with gNB 101 via a link 111. UE 106 is connected with HF network only, which is covered by beam 124 of gNB 102 and is connected with gNB 102 via a link 114. UE 105 is in the overlapping service area of gNB 101 and gNB 102. In one embodiment, UE 105 is configured with dual connectivity and can be connected with eNB/gNB 101 via a link 113 and gNB 102 via a link 115 simultaneously. UE 107 is in the service areas of eNB/gNB 101, gNB 102, and gNB 103. In an embodiment, UE 107 is configured with dual connectivity and can be connected with eNB/gNB 101 with a link 112 and gNB 103 with a link 117. In an embodiment, UE 107 can switch to a link 116 connecting to gNB 102 upon connection failure with gNB 103.

FIG. 1 further illustrates simplified block diagrams 130 and 150 for UE 107 and gNB 103, respectively. Mobile station 107 has an antenna 135, which transmits and receives radio signals. A RF transceiver module 133, coupled with the antenna, receives RF signals from antenna 135, converts them to baseband signal, and sends them to processor 132. RF transceiver 133 also converts received baseband signals from processor 132, converts them to RF signals, and sends out to antenna 135. Processor 132 processes the received baseband signals and invokes different functional modules to perform features in mobile station 107. Memory 131 stores program instructions and data 134 to control the operations of mobile station 107.

Mobile station 107 also includes multiple function modules that carry out different tasks in accordance with embodiments of the current invention. TX beam unit/circuit 141 determines an interleaved frequency division multiple access (IFDMA)-based beam management (BM) reference signal (RS) TX beam switching points and performs TX beam sweeping on the TX beam switching points, wherein the TX beam is a decomposition of a reference numerology or a concatenation of a plurality of IFDMA signals each defined over a corresponding numerology. A RX beam unit/circuit 142 determines an IFDMA BM RS RX beam switching points and performs RX beam sweeping on the RX beam switching points, wherein the RX beam is a decomposition of a reference numerology or a concatenation of a plurality of IFDMA signals each defined over a corresponding numerology.

Similarly, gNB 103 has an antenna 155, which transmits and receives radio signals. A RF transceiver module 153, coupled with the antenna, receives RF signals from antenna 155, converts them to baseband signals, and sends them to processor 152. RF transceiver 153 also converts received baseband signals from processor 152, converts them to RF signals, and sends out to antenna 155. Processor 152 processes the received baseband signals and invokes different functional modules to perform features in eNB 103. Memory 151 stores program instructions and data 154 to control the operations of gNB 103. gNB 103 also includes multiple function modules that carry out different tasks in accordance with embodiments of the current invention. A TX beam unit/circuit 161 handles TX beam behavior management and performs TX beam sweeping of the gNB 103. A RX beam unit/circuit 162 handles RX beam behavior management and performs RX beam sweeping of the gNB 103.

Figure 2:
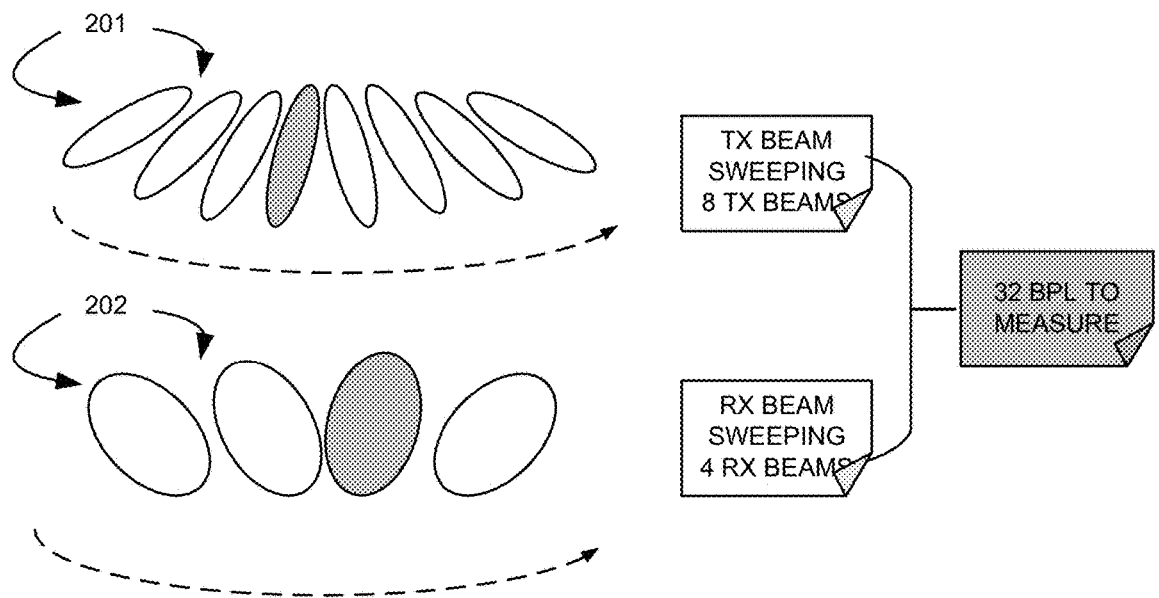
FIG. 2 shows exemplary diagrams TX and RX beam sweeping to generate BPL profile in accordance with embodiments of the current invention.

FIG. 2 shows exemplary diagrams TX and RX beam sweeping to generate BPL profile in accordance with embodiments of the current invention. In the multi-beam wireless network, TX and RX devices perform beam sweeping to measure the TX/RX beam pair links (BPL) profile to determine the best BPL for data communication. The measurement can be either reference signal receiving power (RSRP) or received signal strength indicator (RSSI). In one example as shown, TX beam switching 201 has eight TX beams, and RX beam switching 202 has four RX beams. The complete set of BPL includes the combination of each unique TX/RX pair measurement, which is thirty-two in the combination of 201 and 202 configuration. There are thirty-two measurement to be performed to generate the BPL profile. In one embodiment, the channel state information RS (CSI-RS) is used for BM. In the multi-beam system, the shorter the time span of each BM CSI-RS measurement, the faster the complete set of the BPL can be swept, the more efficient the system performance.

Figure 3:
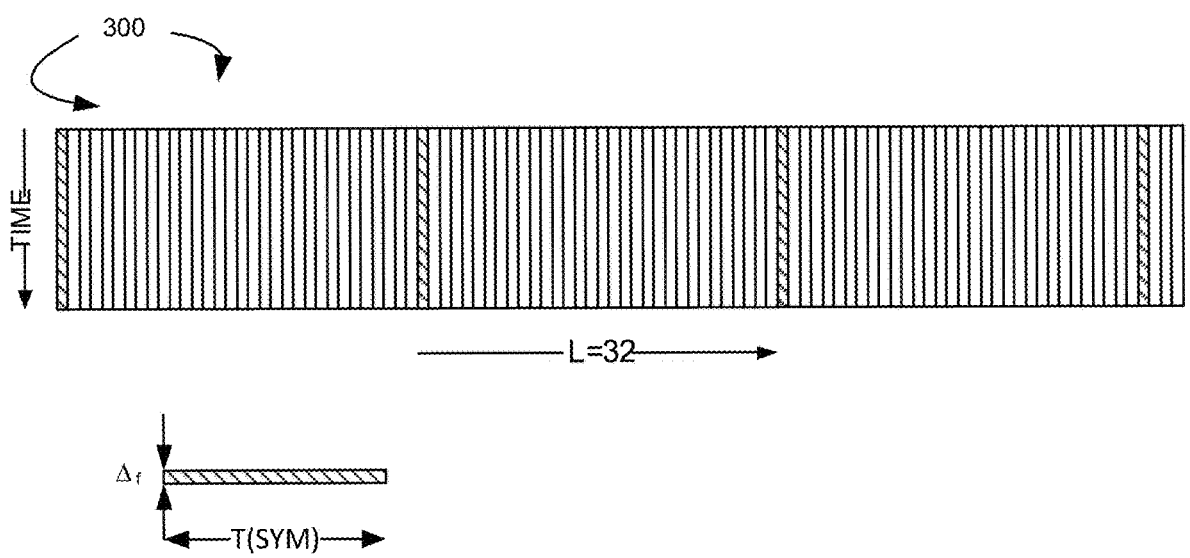
FIG. 3 illustrates an exemplary diagram of the reference numerology configuration of TX/RX OFDM symbols in accordance with embodiments of the current invention.

FIG. 3 illustrates an exemplary diagram of the reference numerology configuration of TX/RX OFDM symbols in accordance with embodiments of the current invention. A numerology for an OFDM waveform includes sub-carrier spacing and cyclic prefix (CP). For a sub-carrier spacing $\Delta_f$ in an OFDM system with a certain reference numerology, the reference time unit for beam switching is the OFDM symbol length $T_{sym}=1/\Delta_f$ plus a cyclic prefix $T_{CP}$. The TX or RX beam are configured in fixed reference time unit and may switch to a different beam in the next reference time unit. The OFDM waveform 300 has the reference time unit $T=T_{sym}+T_{CP}$. The TX/RX beam can only switch at the rate of multiples of the reference time unit. For a BPL with a size of thirty-two, it takes a long time to generate the profile. It is desirable to switch beams at higher rate to speed up the BPL profile measurement. In one novel aspect, a sub-time unit T' shorter than the reference time unit T is defined to achieve this goal. The reference time unit is divided into sub-time unit with shorter intervals. Both the transmitting and the receiving beams can switch from sub-time unit to sub-time unit instead of the default reference time unit.

FIG. 4 shows an exemplary diagram of a CSI-RS defined over sub-time unit using an OFDM numerology corresponding to the sub-time unit with a larger sub-carrier spacing in accordance with one embodiment of the current invention. To shorten the time span of BM RS, one way is to have the BM CSI-RS defined over sub-time unit using an OFDM numerology corresponding to the sub-time unit, which is a larger sub-carrier spacing. The OFMA symbol 400 shows a BM CSI-RS with sub-time unit to be ¼ of the reference time unit. The sub-carrier spacing for the is four times the sub-carrier spacing for the reference numerology. The TX/RX beam can switch over each sub-time unit.

FIG. 5 shows an exemplary diagram of using IFDMA based BM CSI-RS defined over a time unit that is a multiple of the smallest sub-time unit in accordance with embodiments of the current invention. In one novel aspect, the IFDMA-based BM CSI-RS defined over a time unit that is a multiple of the smallest sub-time unit is used. The IFDMA-based reference signal has non-zero sub-carriers only on an equally spaced sub-set of sub-carriers in an OFDM symbol. An IFDMA based reference signal is determined by parameters including the spacing between the interleaved sub-carriers, the offset of the interleaved sub-carriers with regards to a certain reference frequency, and the sequence that modulates the interleaved sub-carriers. OFDMA 500 illustrates an IFDMA-based RS design with sub-time unit. RS symbols 501, 502, and 503 are using sub-time unit for shorter beam sweeping. In novel aspect, the parameter set for each RS sub-carriers are selected such that both the TX and RX beams can switch across any sub-time unit boundary.

FIG. 6 illustrates exemplary diagrams for the single reference numerology for the IFDMA BM RS in accordance with embodiments of the current invention. The IFDMA signal is defined over a single reference numerology 850. Sub-time units 810, 820, 830, and 840 are equal-length sub-time units with the same reference numerology. Both the TX and RX devices/units/circuits can switch beams on the sub-time unit basis. The TX beam switching points 881, 882, and 883 are made known to the receiving RX unit. The RX beam switching. The RX beam switching points 891 and 892 can be determined by the TX unit/device or by the RX unit/device itself. The TX and the RX beam switching behavior applies to both the uplink and the downlink. In one embodiment, the time intervals between each two sub-time units are the same. In another embodiment, the time interval the time intervals between each two sub-time units are the same. During a sub-time unit in which both TX and RX beams are fixed, the RX device measures the BPL profile by correlating the signal received in that sub-time unit with the corresponding modulating sequence, which is a phase rotation of the modulating sequence of the reference numerology. The TX beam switching points and optionally the RX beam switching points are made known to the RX device by at least one of RRC configuration, the MAC CE, the DCI indication or the combinations. The switching point may divide the symbol length (including CP) of the reference numerology into N approximately equal segments of sub-time units where N divides L, the interleaving spacing in number of sub-carriers of the IFDMA signal. The switching point may divide the symbol length (including CP) of the reference numerology into unequal segments of sub-time units where the length of each segment is approximately a multiple of the symbol length of the reference numerology divided by L, which is the interleaving spacing in the number of sub-carriers of the reference.

Figure 7:
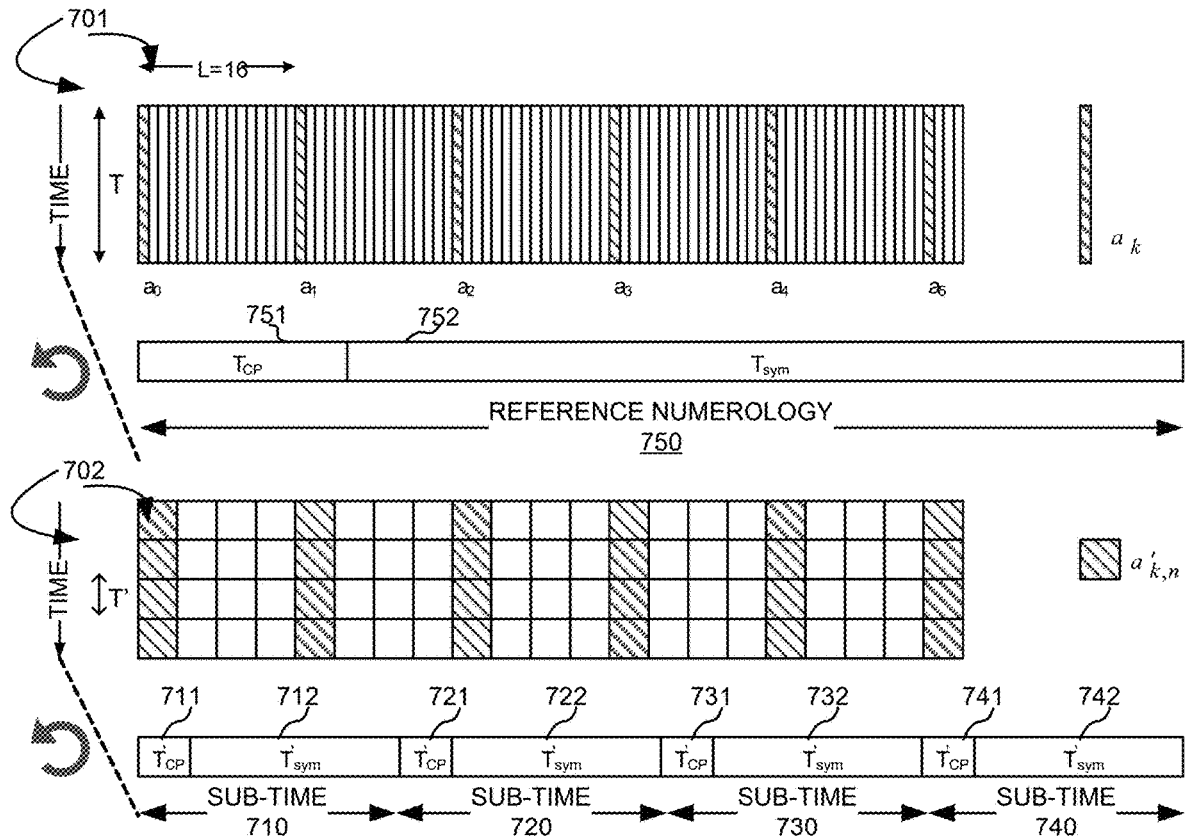
FIG. 7 illustrates exemplary diagrams for equal-length sub-time unit decomposition of the reference numerology for the IFDMA-based BM RS signal in accordance with embodiments of the current invention.
Figure 8:
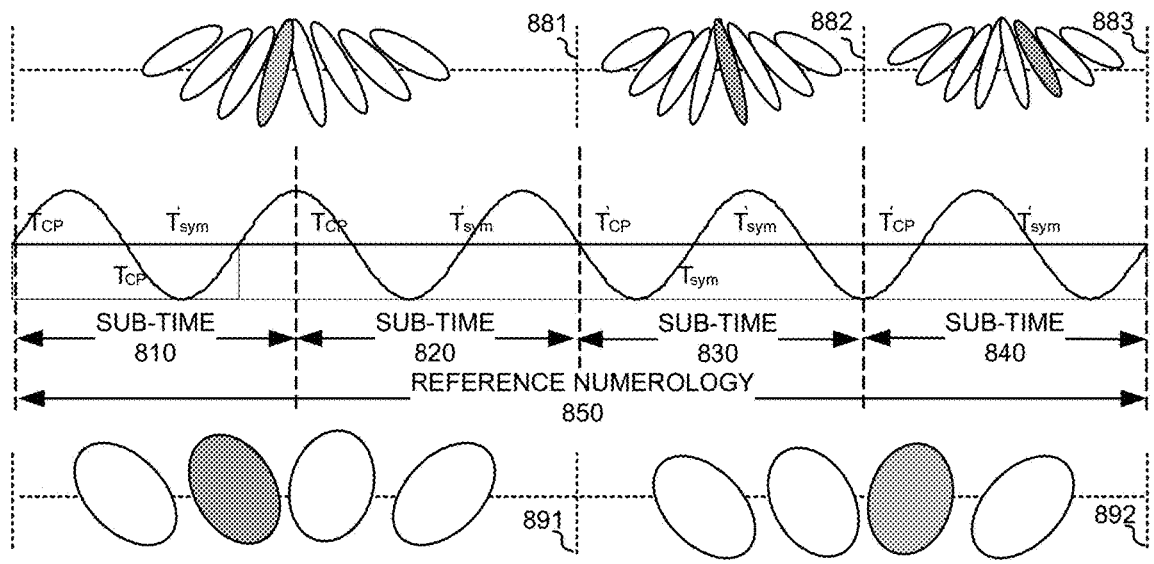
FIG. 8 illustrates an exemplary diagram for the IFDMA-based BM RS with selected parameter set such that both the TX and RX beams can switch across any sub-time unit boundary in accordance with embodiments of the current invention.

In one novel aspect, the TX and the RX beams are each a decomposition of the reference numerology. The IFDMA-based BM RS signal is the decomposition of a RS defined over the reference numerology into equal-length sub-time units. In one embodiment, a single reference numerology is used for the BM RS. FIGS. 7 and 8 illustrate embodiments of this design.

FIG. 7 illustrates exemplary diagrams for equal-length sub-time unit decomposition of the reference numerology for the IFDMA-based BM RS signal in accordance with embodiments of the current invention. Reference numerology 701 for the IFDMA-based BM CSI-RS symbol has a time unit T equals to sum of the reference CP interval 751 and the reference symbol time unit 752. The interleaving spacing L=16. Each reference symbol has a corresponding complex modulation factor $a_k$. In one novel aspect, as shown in 702, the IFDMA-based BM CSI-RS can be decomposed into N equal-length sub-time units, each of length equals to 1/N of the reference time unit T if the interleaving spacing L can be divided by N. Sub-time unit 710, 720, 730, and 740 are equal-length sub-time unit each with a time interval of 1/N of the reference time interval 750. Each of the sub-time unit is the sum of the CP sub-time unit and the symbol sub-time unit. CP sub-time units 711, 721, 731, and 741 each are about 1/N of the reference CP time unit 751. Symbol sub-time units 721, 722, 723, and 724 are of equal-length each equals to 1/N of the reference symbol time unit 752. IFDMA-based BM CSI-RS defined over a reference numerology can be decomposed into N equal-length sub-time units, each with a larger sub-carrier spacing that is N times the reference sub-carrier spacing. The sequence $a_{k,n}'$ that modulates the sub-carriers in each sub-time unit 710, 720, 730, and 740 can be derived from the original modulating sequence $a_k$ defined over the reference numerology. The sequence $a_{k,n}'$ for each sub-time unit that modulates the sub-carriers in each sub-time unit can be derived from the original modulating sequence $a_k$ defined over the reference numerology by $a_{k,n}'=a_k e^{j2\pi kL\Delta_f(T_{CP'}+nT'-T_{CP})}$, where T'=T/N and $T_{CP}'=T_{CP}/N$.

In one embodiment, the BM CSI-RS is an IFDMA signal defined over a single numerology. The single reference numerology may be the same numerology used for the data communication.

FIG. 8 illustrates an exemplary diagram for the IFDMA-based BM RS with selected parameter set such that both the TX and RX beams can switch across any sub-time unit boundary in accordance with embodiments of the current invention. An IFDMA modulated OFDM signal 600 defined over a reference numerology in the time interval of the reference time unit T. In the time domain, reference time interval T is the sum of the symbol time interval and the CP time interval. The symbol time interval is the inverse of the sub-carrier spacing of the OFDM symbol. In the frequency domain, L is the interleaving spacing in the number of sub-carriers. In one embodiment, the reference numerology has the interleaving spacing L=16. The signal is modulated by the complex modulation index on the reference symbol.

In another novel aspect, multiple segments of IFDMA-based BM RS signal are concatenated the IFDMA-based BM RS signal each defined over a specific numerology. The specific numerology over which an IFDMA signal is defined may have a sub-carrier spacing that is greater than the sub-carrier spacing used for data communication. The TX beam remains the same in each of the multiple IFDMA signals and changes across the boundary of adjacent IFDMA signals. Equal-length or variable-length sub-time units can be defined in each of the multiple IFDMA signals according to the single reference numerology embodiment described earlier. TX devices can only switch beams across the boundary of adjacent IFDMA signals. The RX devices can switch beams on a sub-time unit basis in each of the concatenated IFDMA signals. In one embodiment, The TX beam switching points and optionally the RX beam switching points are made known to the RX device. The switching information are received from at least one of the RRC configuration, the MAC CE, and the DCI. The switching points may divide the symbol length (including CP) of the reference numerology into N approximately equal segments of sub-time units where N divides L, the interleaving spacing in number of sub-carriers of the IFDMA signal. The switching points may divide the symbol length (including CP) of the reference numerology into unequal segments of sub-time units where the length of each segment is approximately a multiple of the symbol length of the reference numerology divided by L, which is the interleaving spacing. The RX beam switching point can be determined by the TX device or by the RX device itself. In yet another embodiment, An RX device may perform RX beam sweeping in sub-time units at the instruction of the TX side or at its own discretion. During a sub-time unit in which both TX and RX beams are fixed, the RX device measures the BPL profile by correlating the signal received in that sub-time unit with the phase-rotated modulating sequence derived from the original modulating sequence of the IFDMA signal defined over the reference numerology. The derivation of the phase rotated modulating sequence is a function of at least the reference numerology and the RX switching point in time with respect to the beginning of the transmission of the OFDM symbol of the reference numerology.

Figure 9:
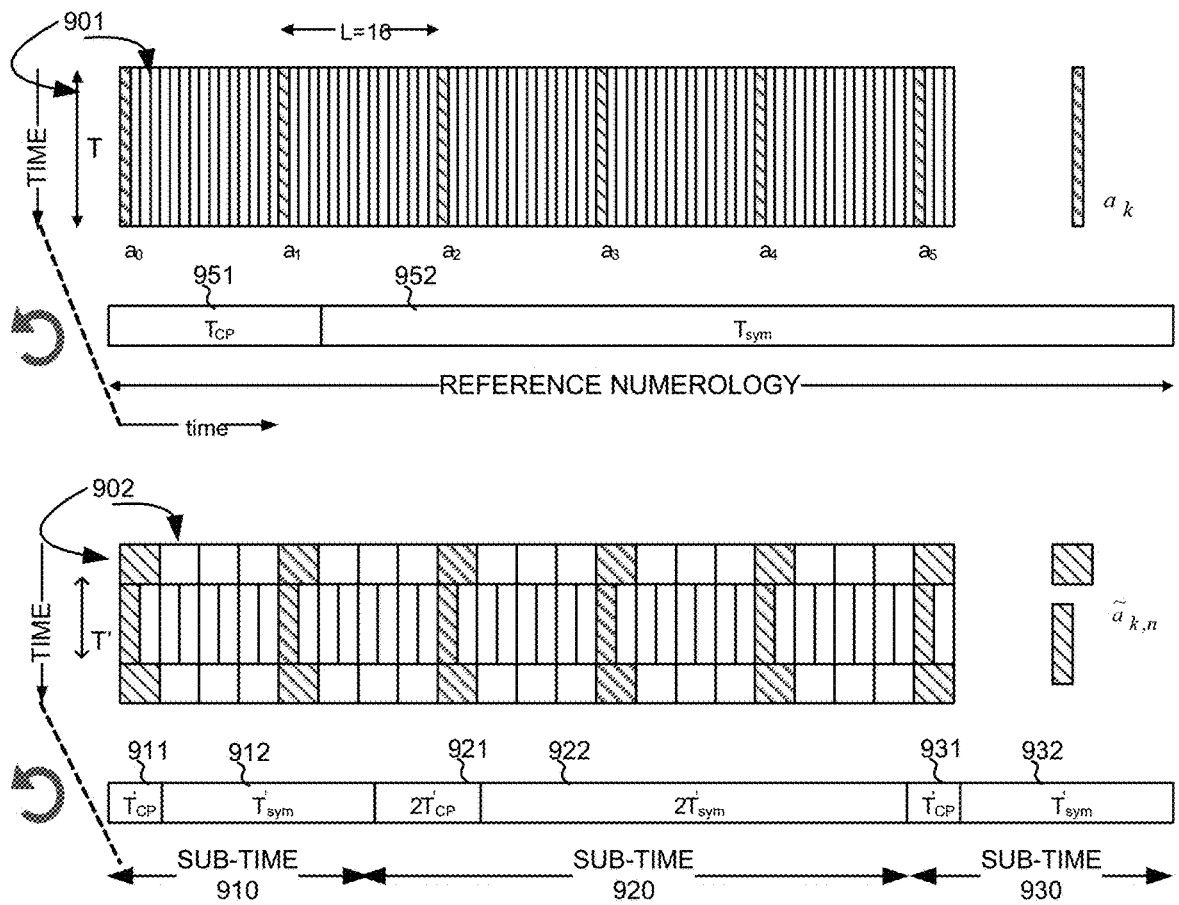
FIG. 9 illustrates exemplary diagrams for variable-length sub-time unit decomposition of the reference numerology for the IFDMA-based BM RS signal in accordance with embodiments of the current invention.

FIG. 9 illustrates exemplary diagrams for variable-length sub-time unit decomposition of the reference numerology for the IFDMA-based BM RS signal in accordance with embodiments of the current invention. Reference numerology 901 for the IFDMA-based BM CSI-RS symbol has a time unit T equals to sum of the reference CP interval 951 and the reference symbol time unit 952. The interleaving spacing L=16. Each reference symbol has a corresponding complex modulation factor $a_k$. In one novel aspect, as shown in 902, the IFDMA-based BM CSI-RS can be decomposed into multiple variable-length sub-time units, each of length equals to a portion of the reference time unit T. Sub-time unit 910, 920, and 930 are variable-length sub-time unit each with a time interval that is portion of the reference time interval 950. Each of the sub-time unit is the sum of the CP sub-time unit and the symbol sub-time unit. CP sub-time units 911, 921, 931 each are about a portion of the reference CP time unit 951. Symbol sub-time units 921, 922, 923 are of variable-length each equals to a portion of the reference symbol time unit 952. IFDMA-based BM CSI-RS defined over a reference numerology can be decomposed into N variable-length sub-time units, each with a larger sub-carrier spacing that is $N_n$ times the reference sub-carrier spacing. The sequence that modulates the sub-carriers in each sub-time unit 910, 920, 930 can be derived from the original modulating sequence defined over the reference numerology 950. The sequence that modulates the sub-carriers in each sub-time unit can be derived from the original modulating sequence $a_k$ defined over the reference numerology.

Figure 10:
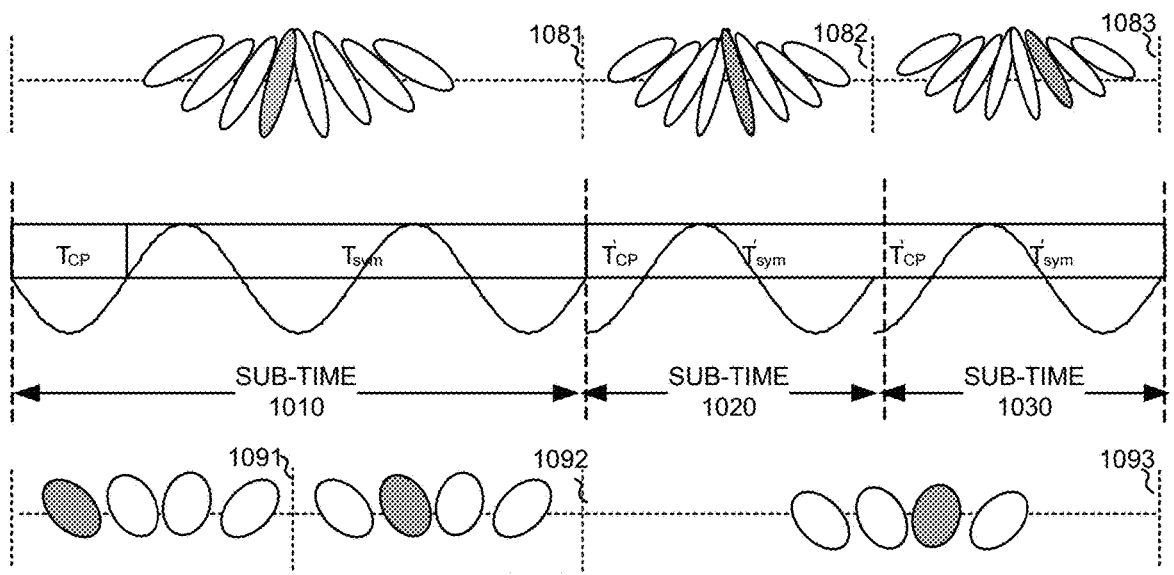
FIG. 10 illustrates exemplary diagrams for concatenation of multiple reference numerologies for the IFDMA-based BM RS signal in accordance with embodiments of the current invention.

FIG. 10 illustrates exemplary diagrams for concatenation of multiple reference numerologies for the IFDMA-based BM RS signal in accordance with embodiments of the current invention. The BM RS is the concatenation of multiple IFDMA signals, each defined over a specific numerology. Sub-time units 1010, 1020, and 1030 have different numerologies and are concatenated to form the BM RS sequence. The specific numerology over which an IFDMA signal is defined may have a sub-carrier spacing that is greater than the sub-carrier spacing used the data communication. The TX beam remains the same in each of the multiple IFDMA signals and changes across the boundary of adjacent IFDMA signal. Equal-length or variable length sub-time units, such as 1010, 1020, and 1030, can be defined in each of the multiple IFDMA signals according to the single reference numerology embodiment as with FIG. 7 and FIG. 8. In one embodiment, the TX devices/units can only switch beams across the boundary of adjacent IFDMA signals. The RX unit/device can switch beams on a sub-time unit basis in each of the concatenated IFDMA signals. The TX beam switching points, such as 1081, 1082, and 1083 are made known to the receiving RX unit/device. The RX beam switching point can be determined by the TX unit/device. In another embodiment, The RX beam switching point can be determined by the RX beam unit/circuit. The TX and the RX beam switching behavior applies to both the uplink and the downlink. During a sub-time unit in which both TX and RX beams are fixed, the RX device measures the BPL profile by correlating the signal received in that sub-time unit with the corresponding modulating sequence in the case of equal-length sub-time unit, where the corresponding modulating sequence is a phase rotation of the corresponding reference sequence $a_k$. In the case of variable-length sub-time unit the modulating sequence $á_{k,n}$ is the reference sequence $a_k$ rotated by an angle that is a function of k and n. In one embodiment, during a sub-time unit in which both TX and RX beams are fixed, the RX device measures the BPL profile by correlating the signal received in that sub-time unit with the phase-rotated modulating sequence derived from the original modulating sequence of the specific IFDMA signal defined over the specific numerology. The derivation of the phase rotated modulating sequence is a function of at least the specific numerology and the RX switching point in time with respect to the beginning of the transmission of the OFDM symbol of the specific numerology.

Figure 11:
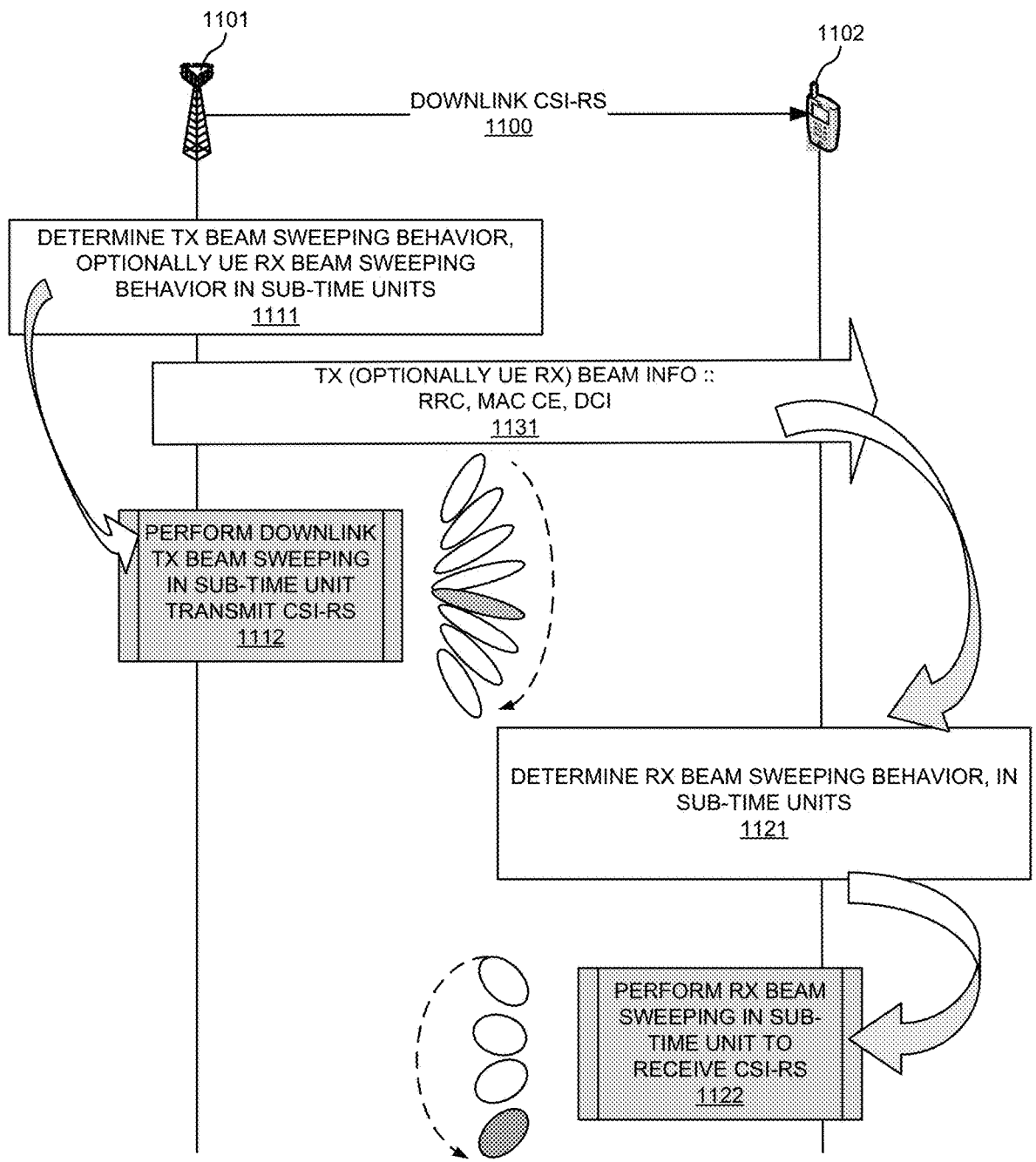
FIG. 11 illustrates an exemplary flow diagram of the downlink CSI-RS beam switching in accordance with embodiments of the current invention.

FIG. 11 illustrates an exemplary flow diagram of the downlink CSI-RS beam switching in accordance with embodiments of the current invention. A UE 1102 communicates with a gNB 1101 and performs uplink CSI-RS beam switching measurements 1100. At step 1111, gNB 1101 determines the TX beam sweeping behavior in sub-time units. In one embodiment, gNB 1101 also determines the UE RX beam sweeping behavior in the sub-time units. At step 1131, the gNB transmits its TX beam sweeping information. In one embodiment, the UE RX beam sweeping behavior is sent to the UE by gNB 1101. In one embodiment, the TX beam sweeping and optionally the UE RX beam sweeping information are sent to the UE using one or more methods including the radio resource control (RRC) signaling, the MAC control element (CE), and the downlink control information (DCI). At step 1112, gNB 1101 performs downlink TX beam sweeping in the sub-time units to transmit CSI-RS based on the determined TX beam sweeping behavior. At step 1121, the UE determines the RX beam sweeping behavior in the sub-time units. In one embodiment, the UE determines the RX beam sweeping behavior based on the information received from the network via at least one of the RRC configuration, the MAC CE, and the DCI indication. In another embodiment, UE 1102 determines the RX beam sweeping behavior in the sub-time units locally. At step 1122, based on the determined RX beam sweeping behavior, UE 1102 performs RX beam sweeping in sub-time units to receive CSI-RS from gNB 1101.

Figure 12:
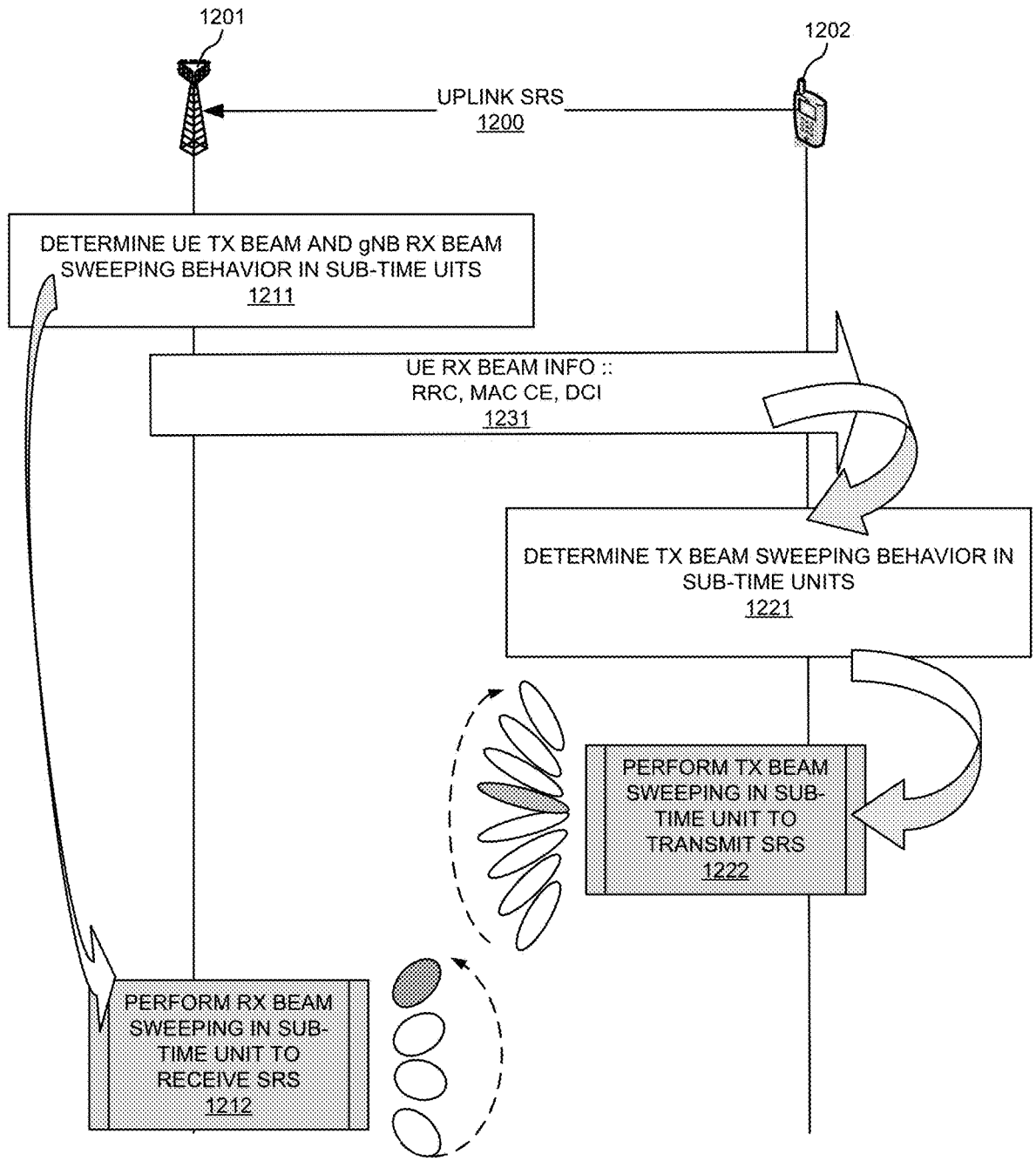
FIG. 12 illustrates an exemplary flow diagram of the uplink SRS beam switching in accordance with embodiments of the current invention.

FIG. 12 illustrates an exemplary flow diagram of the uplink SRS beam switching in accordance with embodiments of the current invention. A UE 1202 communicates with a gNB 1201 and performs uplink SRS beam switching measurements 1200. At step 1211, gNB 1101 determines the UE TX beam sweeping behavior and the gNB RX beam sweeping behavior in sub-time units. At step 1231, the gNB transmits its TX beam sweeping information. In one embodiment, the UE TX beam sweeping behavior is sent to the UE by gNB 1201. In one embodiment, the UE TX beam sweeping information is sent to the UE using one or more methods including the RRC signaling, the MAC CE, and the DCI. In one embodiment, the UE determines the TX beam sweeping behavior based on the information received from the network via at least one of the RRC configuration, the MAC CE, and the DCI indication. At step 1222, based on the determined TX beam sweeping behavior, UE 1202 performs TX beam sweeping in sub-time units to transmit SRS based on the determined UE TX beam sweeping behavior. At step 1212, gNB 1201 performs RX beam sweeping in the sub-time units to receive SRS based on the determined RX beam sweeping behavior. At step 1221, the UE determines the TX beam sweeping behavior in the sub-time units based on the UE TX beam sweeping information received from the network.

Figure 13:
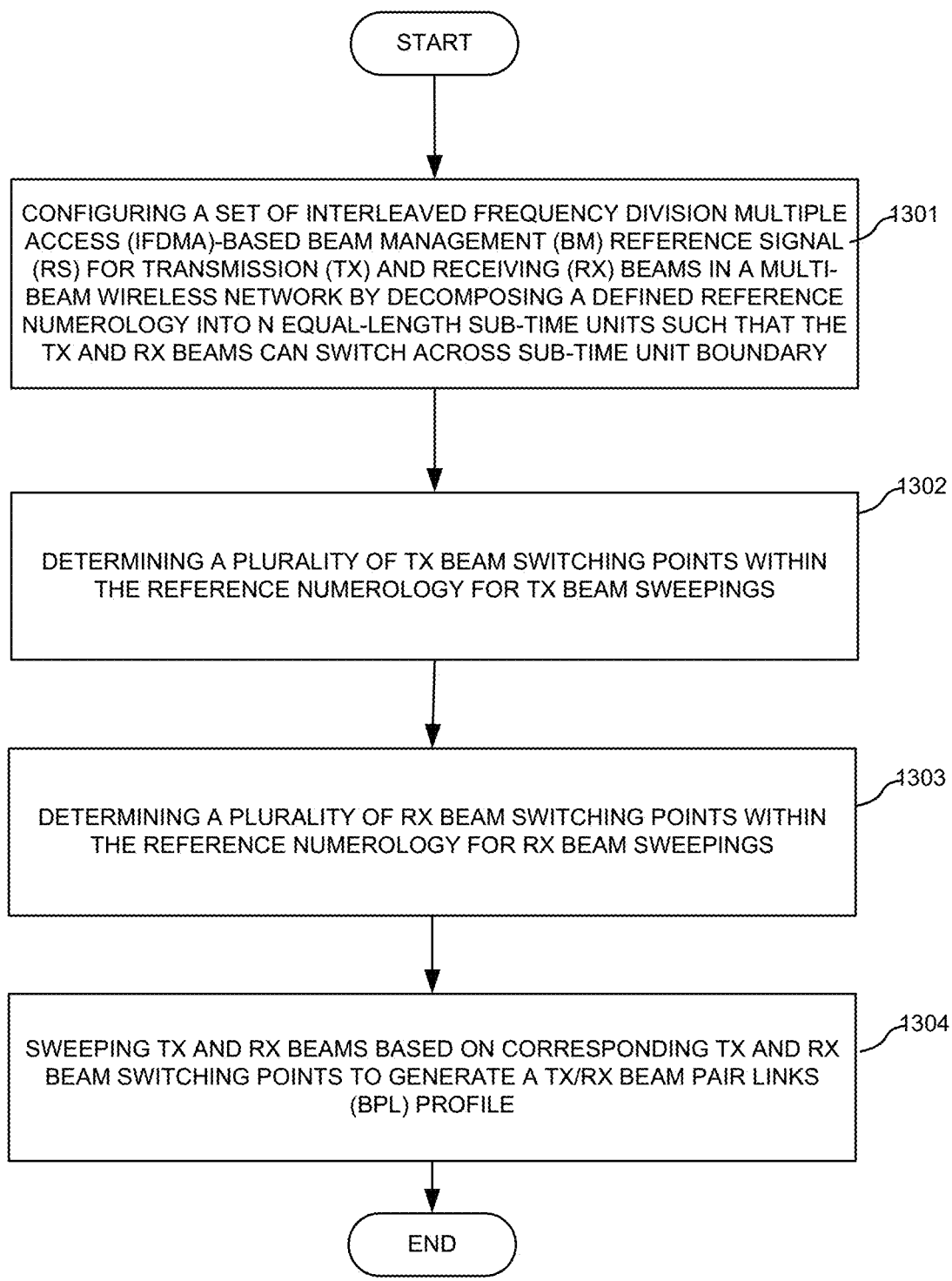
FIG. 13 illustrates an exemplary flow chart for the IFDMA-based BM RS for TX and RX beam sweeping with single reference numerology in accordance with embodiments of the current invention.

FIG. 13 illustrates an exemplary flow chart for the IFDMA-based BM RS for TX and RX beam sweeping with single reference numerology in accordance with embodiments of the current invention. At step 1301, the UE configures a set of IFDMA-based BM RS for TX and RX beams in a multi-beam wireless network by decomposing a defined reference numerology into N equal-length sub-time units such that the TX and RX beams can switch across sub-time unit boundary. At step 1302, the UE determines a plurality of TX beam switching points within the reference numerology for TX beam sweepings. At step 1303, the UE determines a plurality of RX beam switching points within the reference numerology for RX beam sweepings. At step 1304, the UE sweeps TX and RX beams based on corresponding TX and RX beam switching points to generate a TX/RX beam pair links (BPL) profile.

Figure 14:
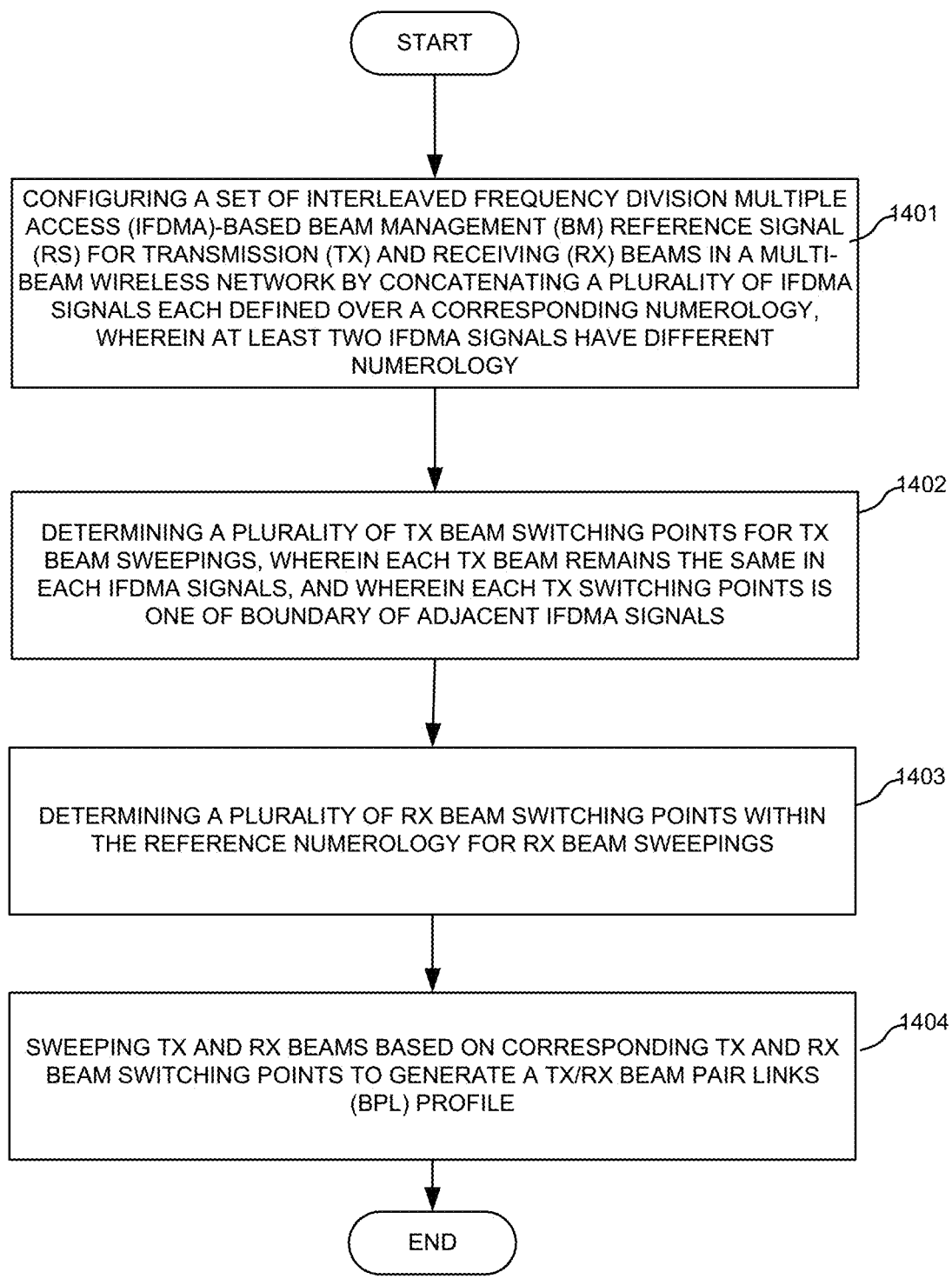
FIG. 14 illustrates an exemplary flow chart for the IFDMA-based BM RS for TX and RX beam sweeping with multiple reference numerologies in accordance with embodiments of the current invention.

FIG. 14 illustrates an exemplary flow chart for the IFDMA-based BM RS for TX and RX beam sweeping with multiple reference numerologies in accordance with embodiments of the current invention. At step 1401, the UE configures a set of interleaved IFDMA-based BM RS for TX and RX beams in a multi-beam wireless network by concatenating a plurality of IFDMA signals each defined over a corresponding numerology, wherein at least two IFDMA signals have different numerology. At step 1402, the UE determines a plurality of TX beam switching points for TX beam sweepings, wherein each TX beam remains the same in each IFDMA signals, and wherein each TX switching points is one of boundary of adjacent IFDMA signals. At step 1403, the UE determines a plurality of RX beam switching points within the reference numerology for RX beam sweepings. At step 1404, the UE sweeps TX and RX beams based on corresponding TX and RX beam switching points to generate a TX/RX beam pair links (BPL) profile.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:
1. A method comprising:
configuring a set of interleaved frequency division multiple access (IFDMA)-based beam management (BM) reference signal (RS) for transmission (TX) and receiving (RX) beams in a multi-beam wireless network by dividing a defined reference numerology into N equal-length sub-time units such that the TX and RX beams can switch across sub-time unit boundary within a single IFDMA signal;

determining a plurality of TX beam switching points within the reference numerology for TX beam sweepings;

determining a plurality of RX beam switching points within the reference numerology for RX beam sweepings; and sweeping TX and RX beams based on corresponding TX and RX beam switching points to generate a TX/RX beam pair links (BPL) profile, wherein the TX and RX beams are fixed when generating each BPL in the profile, and wherein the BPL profile is generated by correlating receiving signals in corresponding sub-time unit in one of a time or frequency domain with an equivalent of phase-rotated modulating sequence derived from an original modulating sequence defined over the reference numerology.

2. The method of claim 1, wherein a TX and a RX symbol length of the reference numerology is divided equally by corresponding TX switching points and the RX switching points.

3. The method of claim 1, wherein at least one of TX symbol length and RX length of the reference numerology is divided unequally by corresponding TX switching points and the RX switching points into unequal segments, and wherein each segment is a multiple of the sub-time unit.

4. The method of claim 1, wherein the RX switching points are determined based on corresponding TX switching points of a TX device that the RX beams are received from.

5. The method of claim 1, wherein the derived modulating sequence is a function of at least the reference numerology and the corresponding relative RX switching point time with respect to a starting TX time of corresponding OFDM symbol for the reference numerology.

6. The method of claim 1, wherein the RS is a channel state information RS (CSI-RS) for a downlink measurement and a sounding reference signal (SRS) for an uplink measurement.

7. The method of claim 1, wherein each sub-time unit is configured with a BM sub-carrier spacing that is N times of a reference sub-carrier spacing based on the reference numerology.

8. A method comprising:

configuring a set of interleaved frequency division multiple access (IFDMA)-based beam management (BM) reference signal (RS) for transmission (TX) and receiving (RX) beams in a multi-beam wireless network by concatenating a plurality of IFDMA signals each defined over a corresponding numerology, wherein at least two IFDMA signals have different numerology;

determining a plurality of TX beam switching points for TX beam sweepings, wherein each TX beam remains the same in each IFDMA signals, and wherein each TX switching points is one of boundary of adjacent IFDMA signals;

determining a plurality of RX beam switching points within the reference numerology for RX beam sweepings; and sweeping TX and RX beams based on corresponding TX and RX beam switching points to generate a TX/RX beam pair links (BPL) profile, wherein the TX and RX beams are fixed when generating each BPL in the profile, and wherein the BPL profile is generated by correlating receiving signals in corresponding sub-time unit in one of a time frequency domain with an equivalent of phase-rotated modulating sequence derived from an original modulating sequence of corresponding IFDMA signal defined over its corresponding reference numerology.

9. The method of claim 8, wherein at least one RX IFDMA signal is divided in N sub-time units of its corresponding reference numerology, and wherein at least one RX beam switching point is at a boundary of a sub-time unit that is not the boundary of adjacent IFDMA signals.

10. The method of claim 8, wherein the RX switching points are determined based on corresponding TX switching points of a TX device that the RX beams are received from.

11. The method of claim 8, wherein the derived modulating sequence is a function of at least the corresponding reference numerology and the corresponding relative RX switching point time with respect to a starting TX time of corresponding OFDM symbol for the corresponding reference numerology.

12. The method of claim 8, wherein the RS is a channel state RS information (CSI-RS) for a downlink measurement and a sounding reference signal (SRS) for an uplink measurement.

13. A user equipment (UE) comprising:

a transceiver that transmits and receives radio signals in a multi-beam wireless communication network;

a transmission (TX) beam unit that determines an interleaved frequency division multiple access (IFDMA)-based beam management (BM) reference signal (RS) TX beam switching points and performs TX beam sweeping on the TX beam switching points, wherein the TX beam is a part of a reference numerology within a single IFDMA or a concatenation of a plurality of IFDMA signals each defined over a corresponding numerology; and a receiving (RX) beam unit that determines an IFDMA BM RS RX beam switching points and performs RX beam sweeping on the RX beam switching points, wherein the RX beam is a part of a reference numerology within a single IFDMA or a concatenation of a plurality of IFDMA signals each defined over a corresponding numerology, wherein a TX/RX beam pair links (BPL) profile is generated by correlating receiving signals in corresponding sub-time unit in which the TX and RX beams are fixed in one of a time or frequency domain with an equivalent of a phase-rotated modulating sequence derived from an original modulating sequence defined over the reference numerology.

14. The UE of claim 13, wherein the TX beam switching points are configured through network with at least one configuration signal comprising a radio resource control (RRC) signal and a downlink control information (DCI) indication.

15. The UE of claim 13, the RX beam switching points are configured through network with at least one configuration signal comprising a radio resource control (RRC) signal and a downlink control information (DCI) indication.

16. The UE of claim 13, the RX beam switching points are determined by the UE.

17. The UE of claim 13, wherein the RX switching points are determined based on corresponding TX switching points of a gNB that the RX beams are received from.

18. The UE of claim 13, wherein the RS is a channel state RS information (CSI-RS) for a downlink measurement and a sounding reference signal RS (SRS) for an uplink measurement.

* * * * *

UNITED STATES PATENT AND TRADEMARK OFFICE
CERTIFICATE OF CORRECTION

PATENT NO. : 10,873,862 B2  
APPLICATION NO. : 16/127595  
DATED : December 22, 2020  
INVENTOR(S) : Jian-Ching Guey et al.

Page 1 of 1

It is certified that error appears in the above-identified patent and that said Letters Patent is hereby corrected as shown below:

In the Claims (1) Column 11, Line 14, Claim 1: insert --a-- between the words "of" and "phase-rotated"

(2) Column 11, Line 64, Claim 8: insert --or-- between the words "time" and "frequency"

(3) Column 11, Line 65, Claim 8: insert --a-- between the words "of" and "phase-rotated"

Signed and Sealed this  
Sixteenth Day of March, 2021

Drew Hirshfeld  
*Performing the Functions and Duties of the*  
*Under Secretary of Commerce for Intellectual Property and*  
*Director of the United States Patent and Trademark Office*